United States Patent
Rodriguez, Jr. et al.

(10) Patent No.: US 7,850,311 B2
(45) Date of Patent: Dec. 14, 2010

(54) PROJECTION DISPLAY DEVICE WITH A PROJECTION MODULE

(75) Inventors: Ernesto M. Rodriguez, Jr., Austin, TX (US); Patricia M. Hughes, Round Rock, TX (US); William E. Haushalter, Spicewood, TX (US); Kai Chang Lu, Birmingham (GB); Steven G. Saxe, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/021,877

(22) Filed: Jan. 29, 2008

(65) Prior Publication Data

US 2008/0137040 A1 Jun. 12, 2008

Related U.S. Application Data

(62) Division of application No. 11/003,278, filed on Dec. 3, 2004, now abandoned.

(60) Provisional application No. 60/527,424, filed on Dec. 5, 2003, provisional application No. 60/556,612, filed on Mar. 26, 2004, provisional application No. 60/584,691, filed on Jul. 1, 2004, provisional application No. 60/584,692, filed on Jul. 1, 2004, provisional application No. 60/584,693, filed on Jul. 1, 2004.

(51) Int. Cl.
*G03B 21/14* (2006.01)

(52) U.S. Cl. .................. 353/69; 353/119; 353/122; 353/79

(58) Field of Classification Search .............. 353/69, 353/79, 119, 121, 122
See application file for complete search history.

(56) References Cited

U.S. PATENT DOCUMENTS

| 1,643,134 | A | * | 9/1927 | Serrurier | 353/72 |
| 1,870,702 | A | * | 8/1932 | Zworykin | 348/14.16 |
| 4,070,098 | A | | 1/1978 | Buchroeder | |
| 4,256,373 | A | | 3/1981 | Horimoto | |
| 4,908,705 | A | | 3/1990 | Wight | |
| 4,976,429 | A | | 12/1990 | Nagel | |

(Continued)

FOREIGN PATENT DOCUMENTS

DE 29 20 360 A1 11/1980

(Continued)

OTHER PUBLICATIONS

Stupp, E.H. & Brennesholtz, M.S.; Projection Displays; John Wiley & Sons Ltd. (1999); pp. 146-150 and 205-208.

(Continued)

*Primary Examiner*—William C Dowling

(57) ABSTRACT

A front projection display device having a projection module and a docking station. The docking station has a base. Further, the docking station can include an extendable arm attached to the base. The projection module contains an optical engine. The optical engine includes an illumination system, an imaging system, and a wide-angle projection lens. The optical engine outputs an image at a half field angle of at least 45°. The projected image has substantially no distortion and requires substantially no keystone correction.

4 Claims, 10 Drawing Sheets

U.S. PATENT DOCUMENTS

| | | | |
|---|---|---|---|
| 5,363,242 A | | 11/1994 | Yokota et al. |
| 5,390,048 A | | 2/1995 | Miyatake et al. |
| 5,442,484 A | | 8/1995 | Shikawa |
| 5,459,539 A | | 10/1995 | Yamamoto |
| 5,510,862 A | | 4/1996 | Lieberman et al. |
| 5,515,125 A | * | 5/1996 | Gerver .................. 353/122 |
| 5,526,186 A | | 6/1996 | Sekine |
| 5,600,488 A | * | 2/1997 | Minefuji et al. ......... 359/651 |
| 5,606,459 A | | 2/1997 | Nakatsuji |
| 5,625,495 A | | 4/1997 | Moskovich |
| 5,640,215 A | * | 6/1997 | Catta ..................... 348/789 |
| 5,664,859 A | | 9/1997 | Salerno et al. |
| 5,870,228 A | | 2/1999 | Kreitzer et al. |
| 5,900,987 A | | 5/1999 | Kreitzer |
| 5,969,876 A | | 10/1999 | Kreitzer et al. |
| 5,978,150 A | | 11/1999 | Hamanishi et al. |
| 6,109,767 A | | 8/2000 | Rodriguez |
| 6,124,979 A | * | 9/2000 | Hirata et al. ............ 359/651 |
| 6,137,638 A | | 10/2000 | Yamagishi et al. |
| 6,179,426 B1 | | 1/2001 | Rodriguez, Jr. et al. |
| 6,188,522 B1 | | 2/2001 | Kimura et al. |
| 6,188,523 B1 | | 2/2001 | Choi |
| 6,224,216 B1 | | 5/2001 | Parker et al. |
| 6,275,343 B1 | | 8/2001 | Takamoto et al. |
| 6,299,313 B1 | * | 10/2001 | Hirata et al. ............. 353/54 |
| 6,334,687 B1 | | 1/2002 | Chino et al. |
| 6,439,726 B1 | | 8/2002 | Piehler |
| 6,476,981 B1 | | 11/2002 | Shikama |
| 6,540,366 B2 | | 4/2003 | Keenan et al. |
| 6,542,308 B2 | * | 4/2003 | Hirata et al. ............ 359/649 |
| 6,542,316 B2 | | 4/2003 | Yoneyama |
| 6,560,041 B2 | * | 5/2003 | Ikeda et al. ............. 359/749 |
| 6,578,999 B2 | | 6/2003 | Schmidt et al. |
| 6,580,469 B1 | | 6/2003 | Reiche et al. |
| 6,604,829 B2 | | 8/2003 | Rodriguez, Jr. |
| 6,624,952 B2 | | 9/2003 | Kuwa et al. |
| 6,896,375 B2 | | 5/2005 | Peterson et al. |
| 6,937,401 B2 | | 8/2005 | Sugano |
| 6,962,417 B1 | | 11/2005 | Teng et al. |
| 6,975,460 B2 | * | 12/2005 | Ikeda et al. ............. 359/649 |
| 7,009,765 B2 | * | 3/2006 | Gohman .................. 359/434 |
| 7,111,852 B2 | * | 9/2006 | Woods et al. ........... 280/47.34 |
| 7,123,426 B2 | | 10/2006 | Lu et al. |
| 7,126,767 B2 | | 10/2006 | Lu |
| 7,150,537 B2 | | 12/2006 | Peterson et al. |
| 7,271,964 B2 | | 9/2007 | Rodriguez, Jr. et al. |
| 2001/0052965 A1 | | 12/2001 | Rodriguez, Jr. |
| 2002/0034017 A1 | * | 3/2002 | Hirata et al. ............ 359/649 |
| 2002/0057505 A1 | | 5/2002 | Sato |
| 2002/0060859 A1 | | 5/2002 | Yoneyama |
| 2002/0097500 A1 | * | 7/2002 | Ikeda et al. ............. 359/651 |
| 2002/0154418 A1 | | 10/2002 | Shikama |
| 2003/0137744 A1 | | 7/2003 | Kuwa et al. |
| 2003/0197954 A1 | * | 10/2003 | Ikeda et al. ............. 359/726 |
| 2003/0231261 A1 | | 12/2003 | Bassi et al. |
| 2004/0080720 A1 | | 4/2004 | Saito |
| 2004/0223123 A1 | | 11/2004 | Engle et al. |
| 2004/0233394 A1 | | 11/2004 | Gohman |
| 2005/0083486 A1 | | 4/2005 | Johnson |
| 2005/0105055 A1 | | 5/2005 | Oross |
| 2005/0122484 A1 | | 6/2005 | Rodriguez, Jr. et al. |
| 2005/0168707 A1 | * | 8/2005 | Feldpausch et al. ........... 353/79 |
| 2007/0201005 A1 | | 8/2007 | Rhodes et al. |
| 2007/0285624 A1 | | 12/2007 | Rodriguez, Jr. et al. |

FOREIGN PATENT DOCUMENTS

| | | |
|---|---|---|
| DE | 103 07 740 A1 | 9/2004 |
| JP | 62-201737 U | 12/1987 |
| JP | 02-027390 U | 2/1990 |
| JP | 02-196230 A | 8/1990 |
| JP | 02-230288 A | 9/1990 |
| JP | 03-027085 A | 2/1991 |
| JP | 03-056951 A | 3/1991 |
| JP | 07-151971 | 6/1995 |
| JP | 10-206969 A | 8/1998 |
| JP | 2002-082387 | 3/2002 |
| JP | 2003-015033 | 1/2003 |
| JP | 2003-015221 | 1/2003 |
| JP | 2003-057545 | 2/2003 |
| JP | 2003-156683 | 5/2003 |
| JP | 2003-330108 | 11/2003 |
| JP | 2004-245893 | 9/2004 |
| WO | WO 97/16927 | 5/1997 |
| WO | WO 00/67059 | 11/2000 |
| WO | WO 2004/109365 | 12/2004 |

OTHER PUBLICATIONS

Product Brochure, "Display Technologies by Carl Zeiss", Carl Zeiss Jena GmbH, Jena, Germany (date unknown).

* cited by examiner

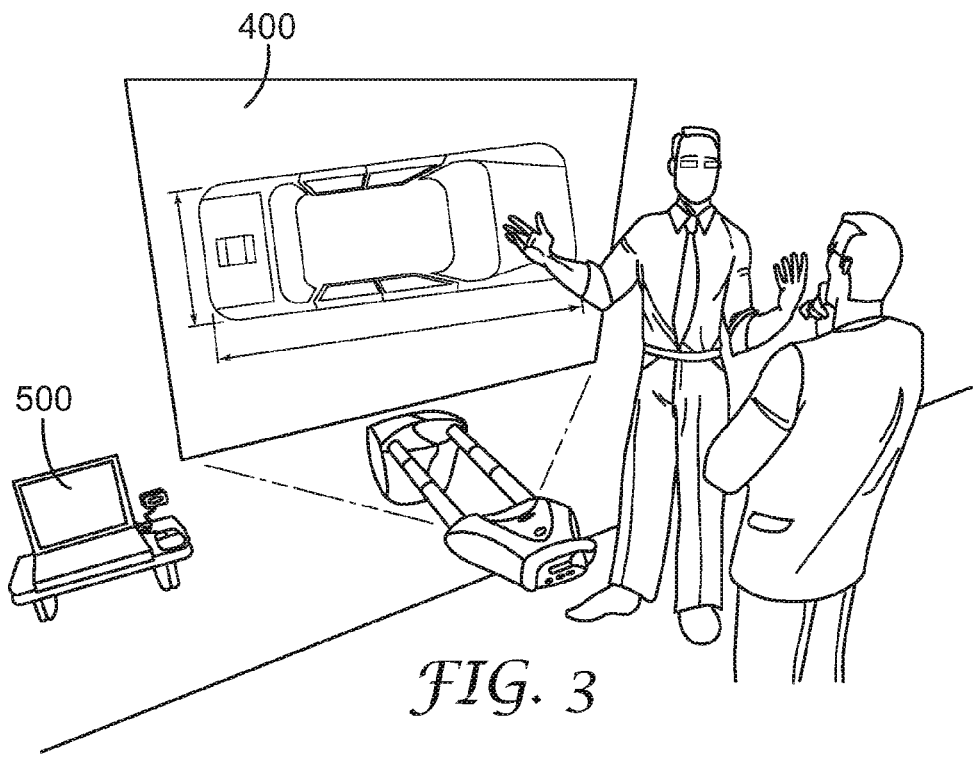
FIG. 3
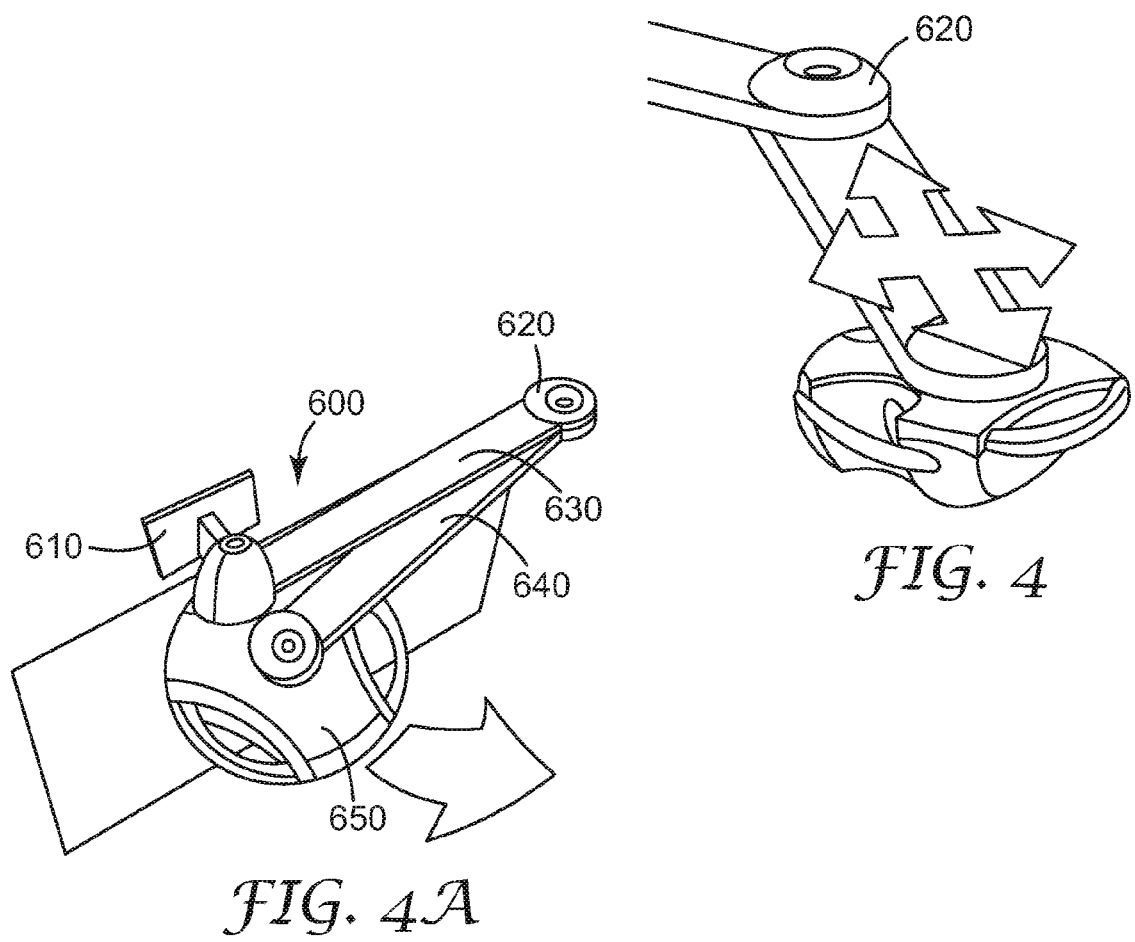
FIG. 4
FIG. 4A

PROJECTION DISPLAY DEVICE WITH A PROJECTION MODULE

CROSS-REFERENCE TO RELATED APPLICATIONS

The present application is a divisional of U.S. application Ser. No. 11/003,278, filed Dec. 3, 2004, now abandoned which claims priority to U.S. Provisional Application Ser. No. 60/527,424 filed on Dec. 5, 2003 entitled "Wide-Angle Projection Lens For Front Projection Display Systems"; U.S. Provisional Application Ser. No. 60/556,612 filed on Mar. 26, 2004, entitled "Projection Display Device for Multimedia and Wall Display Systems"; U.S. Provisional Application Ser. No. 60/584,691 filed Jul. 1, 2004, entitled "Dockable Projection Display Device with Extendable Arms"; U.S. Provisional Application Ser. No. 60/584,692 filed Jul. 1, 2004, entitled "Mobile Media Station"; and U.S. Provisional Application Ser. No. 60/584,693 filed Jul. 1, 2004, entitled "Dockable Projection Display Device". The disclosures of each of the aforementioned Applications is incorporated by reference herein in their entirety.

FIELD OF INVENTION

The present invention relates to a front projection display device. In particular, the front projection display device can be utilized in short throw distance applications. In particular, the present invention relates to a front projection display device that can be docked into a station and that produces an image with substantially no distortion and that requires little to no keystone correction. The front projection display device can include an extendable arm. Further, the front projection display device can be docked in a mobile media station.

BACKGROUND

Electronic or video display systems are devices capable of presenting video or electronic generated images. Whether used in home entertainment, advertising, videoconferences or group conferences, the demand exists for an appropriate display device.

Image quality is one of the factors consumers use to determine the appropriate display device. In general, image quality can be determined qualitatively by factors such as image resolution and image color. As the desire by some consumers is for display devices having larger picture size, image quality can suffer. Typically, a large picture size is one that exceeds about 40 inch screen size as measured along the diagonal of the screen.

While many display devices are available on the market today in front projection systems, there is a continuing need to develop other devices.

SUMMARY

In one aspect, the present invention pertains to a front projection display device comprising a projection module and a docking station. The projection module comprises an optical engine. The optical engine includes an illumination system, an imaging system, and a wide-angle projection lens. The optical engine outputs an image at a half field angle of at least 45°. Advantageously, the image has substantially no distortion and requires substantially no keystone correction. The docking station can comprise a base and an extendable arm attached to the base.

According to another aspect, a mobile media station can include a cart, a screen attachable to the cart, and a projection display device disposed on the cart to provide an image to the screen. The projection display device includes a projection module having an optical engine, such as described above, and a docking station.

The front projection display device and projection module of the present invention can be used in a short throw distance, extreme off-axis application. The term "throw distance" means the distance defined by the normal from the projection screen to the projection lens. The phrase "short throw distance" means a distance of less than one meter. The term "extreme off-axis" means the projected image subtends an angle of greater than 45 degrees.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The invention can be better described with reference to the following figures, wherein:

FIG. 3 is a schematic view of the device of FIG. 1 in a projection mode;

FIGS. 4, 4A, 4B, and 4C are schematic views of various portions of another exemplary embodiment of a docking station of the present invention;

Figure 1:
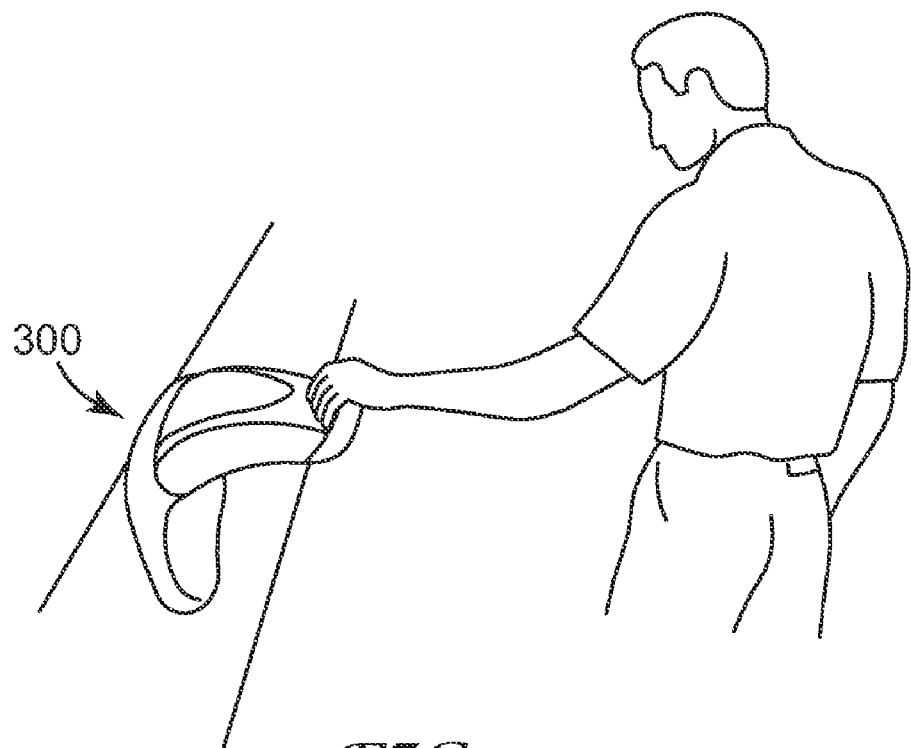
FIG. 1 is a schematic view of an exemplary front projection display device of the present invention in a storage position.

These figures are not drawn to scale and are intended only for illustrative purposes. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

Figure 2:
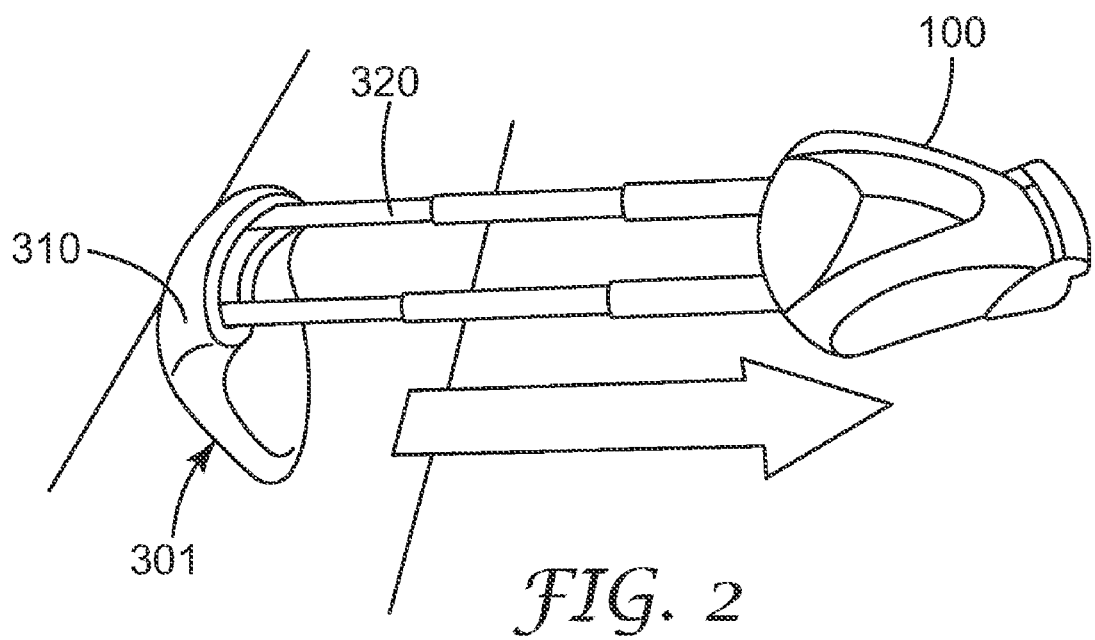
FIG. 2 is a schematic view of the device of FIG. 1 in a use position.

FIG. 1 shows an exemplary front projection display device 300 in a storage position. FIG. 2 is a schematic view of device 300 in a use position. The front projection display device has projection module 100 and a docking station 301. The projection module includes an optical engine to project an image to a viewing screen or surface. An exemplary optical engine is described in further detail below.

The docking station 301 includes base 310 and extendable telescopic arms 320. In this particular embodiment, the base can be permanently attached to a surface, such as a wall. In one embodiment, the projection module has a handle and manual focusing mechanism. The handle is a desirable feature as it allows for portability of the projection module.

FIG. 3 is a schematic view of the front projection display device of FIG. 1 in use. The projection device can create an image on a projection surface 400, such as a projection screen or, in this particular case, on a wall. If desired, a computer 500 can be interfaced with the display device for presentation purposes. Although FIG. 3 shows display device 300 positioned generally beneath the image, one skilled in the art will recognize that the device can alternatively be positioned generally above the image.

Figure 4B:
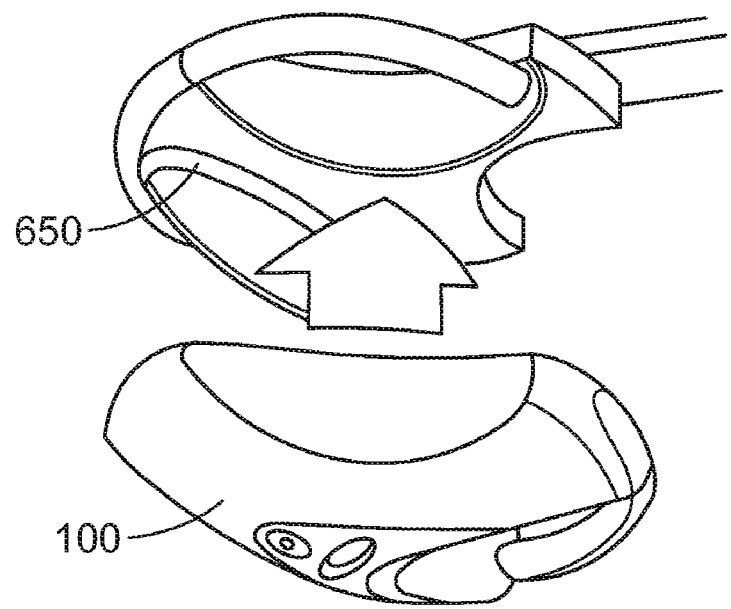
Figure 4C:
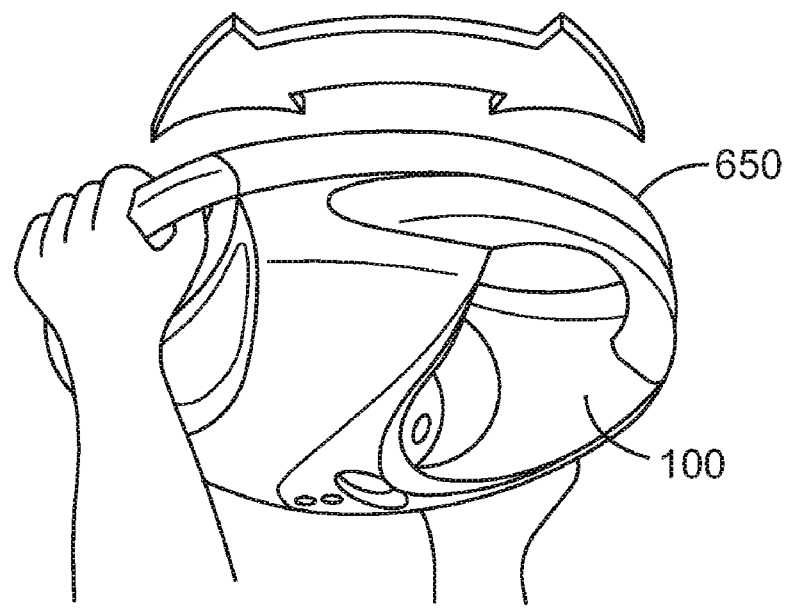

FIGS. 4 and 4A show schematic views of another embodiment of a docking station that can be used in the front projection display device of the present invention. In this embodiment, docking station 600 has a base 610, arms 630 (first arm portion) and 640 (second arm portion) connected by hinged elbow 620, and a dock 650 located distal to the base. The arms can be flexible arms, allowing for movement so that the presenter can have more flexibility in positioning the display device. FIG. 4A shows that the second arm portion can be lengthened or shortened, as necessary, and can accommodate lateral movements. FIG. 4B shows projection module 100 ready to be installed into dock 650. FIG. 4C shows one exemplary method of installing the projection module to the dock, in this case, by twisting the projection module into the dock.

Figure 5:
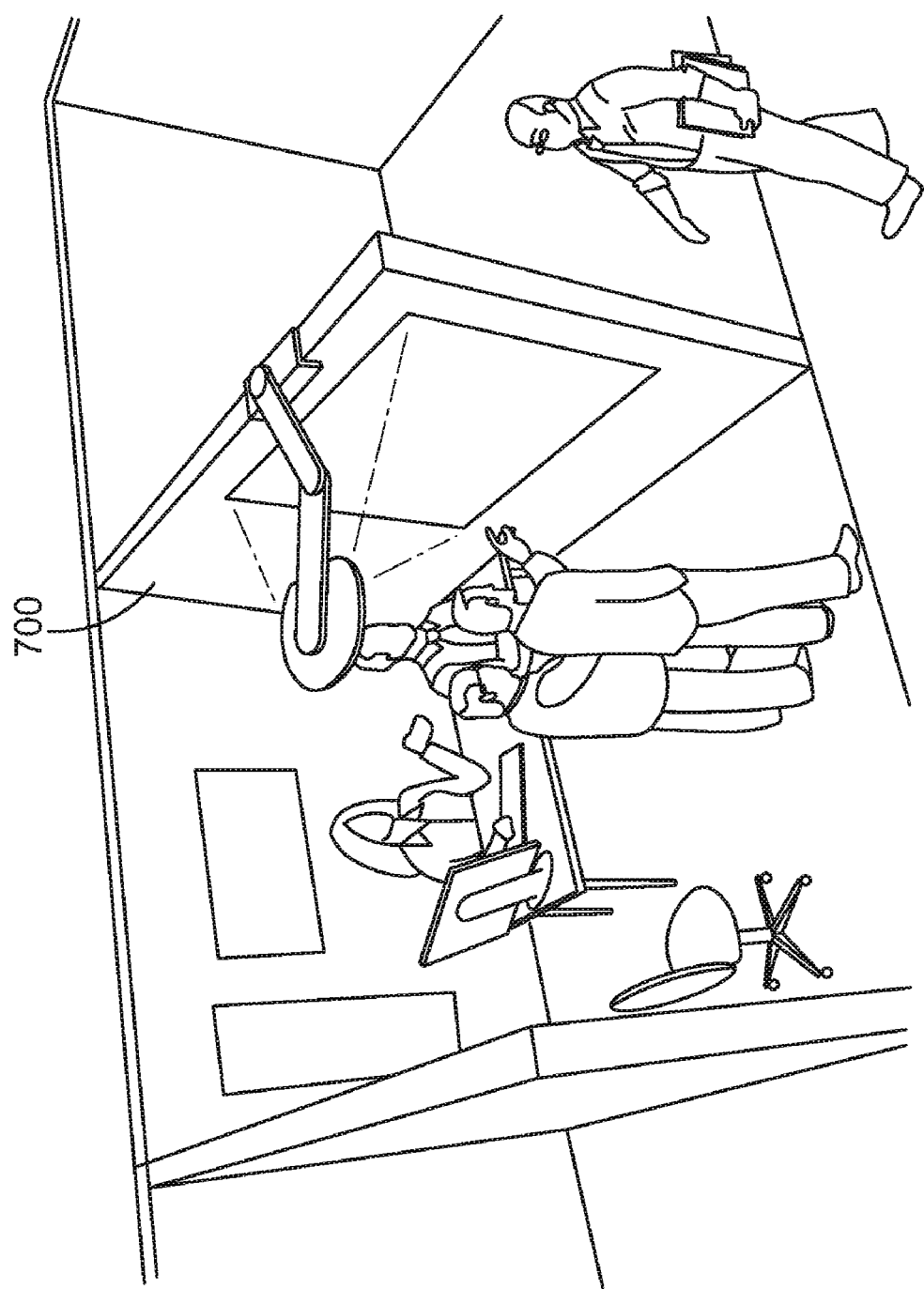
FIG. 5 is a schematic representation the front projection display device used in an office setting.

FIG. 5 shows the front projection display device, using the docking station type of FIG. 4, mounted to temporary or movable wall 700, such as a cubicle wall. The device shown in FIG. 5 can be particularly useful in a trade show setting.

In yet another exemplary embodiment, the base of the docking station can be attached to a board, such as a white board. In use, the arms swing out so that the projection module is generally in front of the white board, just beneath or just above the white board. When not in use, the arms swing in so that they lie generally parallel to the surface of the board.

The extendable arms, whether the telescopic arms 320 of FIG. 2, or the flexible arms 630 and 640 of FIG. 4A, can be equipped with various accessories to support operation of the projection module. For example, the docking station can contain a power supply to supply power to the module, communication wires or lines to provide communication between the projection module and a computer (not shown), and connections for making a wired or a wireless network connection. The wired/wireless network connection can provide, among other things, central administrative control function to allow a central office the ability to monitor use of the projection device. The network connection can also provide access to infrastructure network to allow a presenter access to and display of files residing on the network. The network connection could allow the presenter, in an ad hoc mode, to receive information, such as presentation graphics, from a local computer. The projection module has a port containing an interface for communication with the docking station. Although telescopic and flexible arms are exemplified, one skilled in the art will recognize that there are alternative designs for the extension arms.

Figure 6:
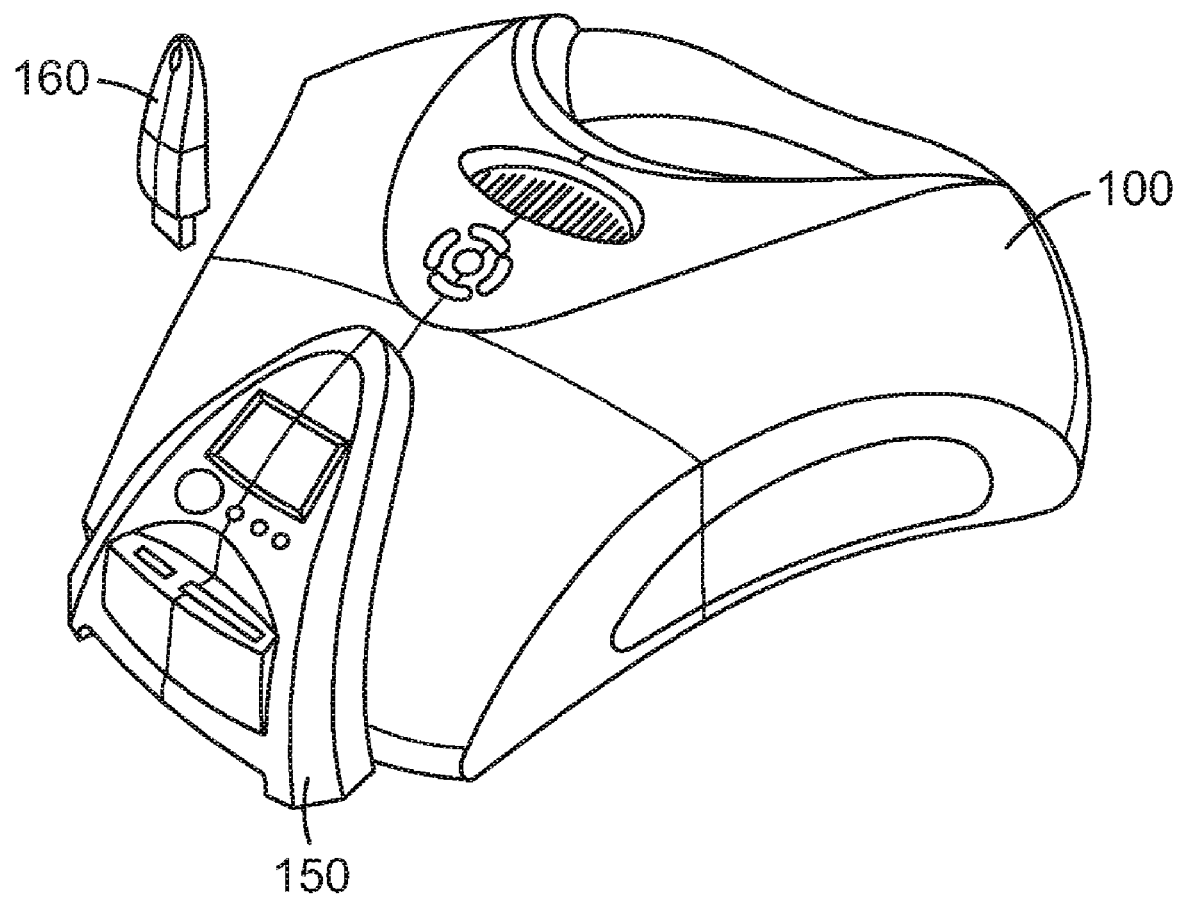
FIG. 6 is schematic view of the projection module equipped with an exemplary expansion module.

FIG. 6 shows another exemplary embodiment of the invention where projection module 100 is equipped with expansion module 150 and optional memory stick 160. The expansion module can allow for such features as wireless connection to a computer (not shown), a media player capable of running presentation software, and/or a picture player. The expansion module connects with the interface in the port of the projection module. The projection module containing the expansion module can be used as a stand-alone unit or be used with the docking station.

Figure 8:
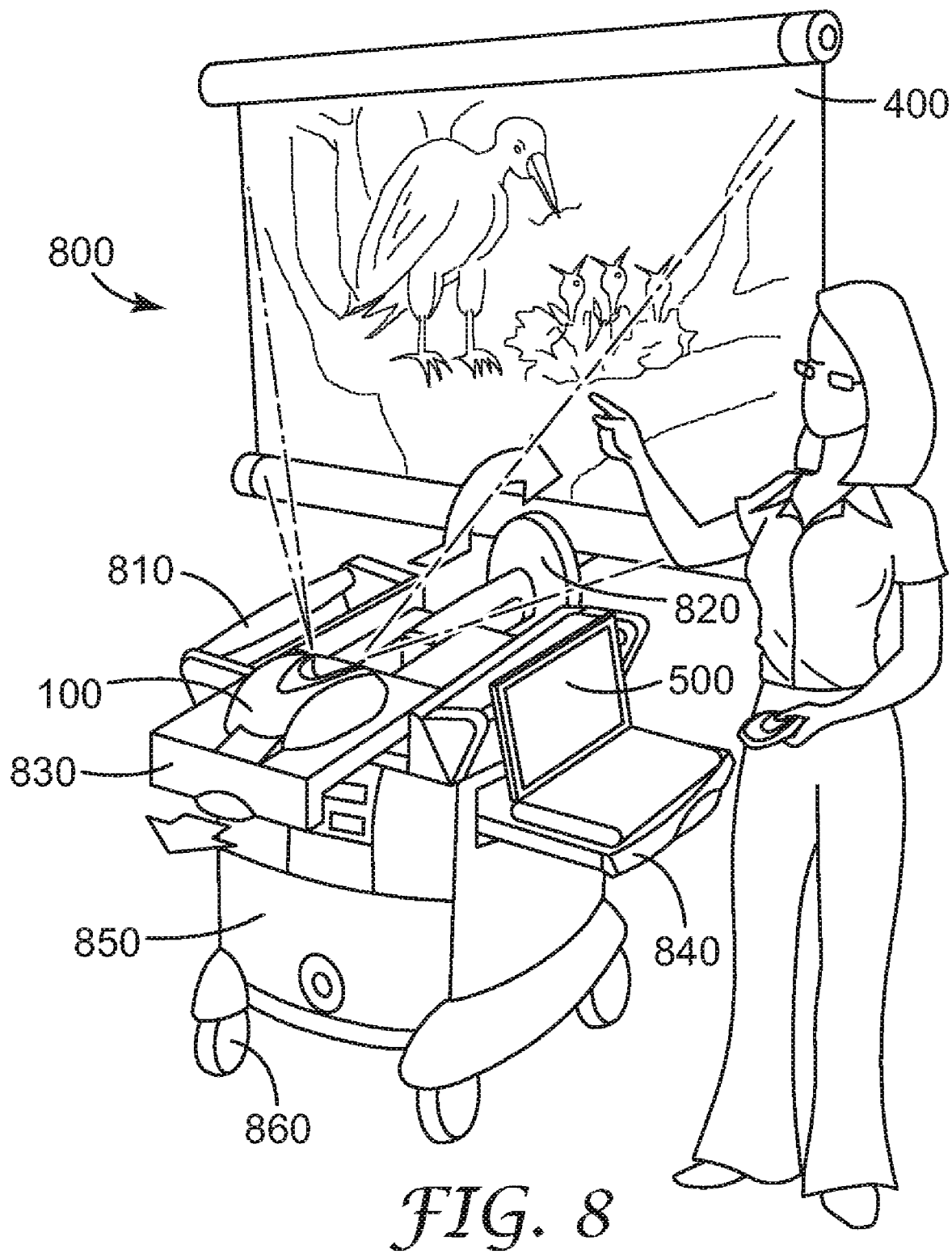
FIG. 8 shows a schematic view of a mobile media station according to another embodiment of the invention.
Figure 10:
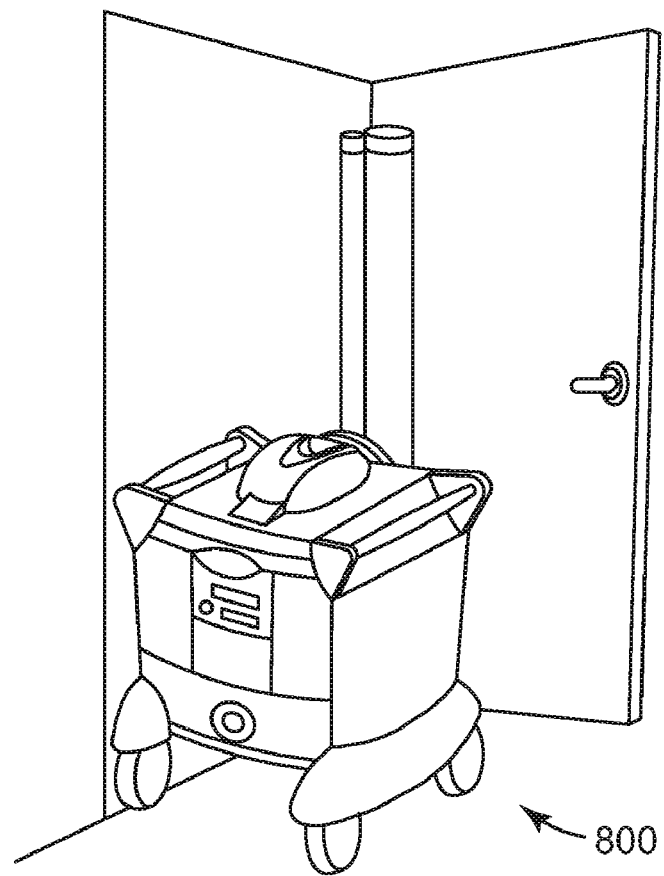
FIG. 10 shows another view of the mobile media station of FIG. 8.

FIG. 8 shows yet another embodiment, an exemplary mobile media station 800 having main body 850, handle 810, projection screen attachment device 820, slidable trays 830 and 840 and optionally wheels 860 for easy transport to and from various locations. For example, FIG. 10 shows that mobile media station 800, when not in use, can easily be stored in a storage space. One skilled in the art can appreciate that there are alternative designs to the use of a cart and wheels to make the media station mobile.

A front projection display device comprising projection exemplary module 100 and a docking station can be mounted to slidable tray 830. Slidable tray 840 can accommodate computer 500, if one is used. Projection screen 400 can be attached to the cart using attachment device 820. If desired, however, the screen can be detached from the cart and the mobile media station can be placed in front of a wall, which would serve as the projection area. In use, the projection module is positioned less than one meter away from the projection area.

Figure 9:
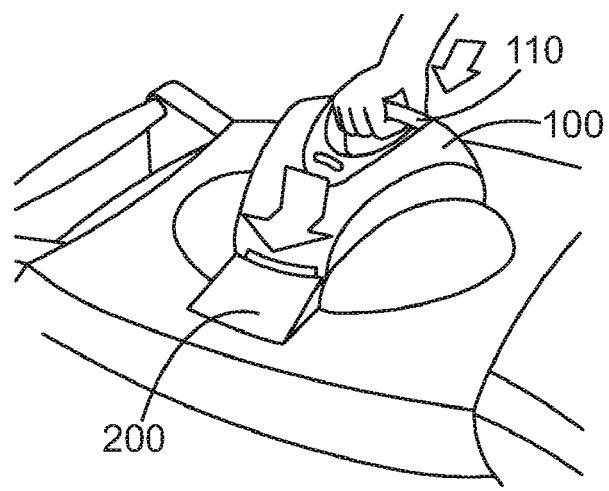
FIG. 9 shows a user attaching an exemplary projection module to a docking station.

FIG. 9 further illustrates that a user can readily attach projection module 100 to a docking station 200 by using handle 110.

In exemplary embodiments, as mentioned above, an exemplary docking station can be equipped with various accessories to support operation of the projection module, such as a power supply, communication wires or lines, and connections for making a wired or a wireless network connection. Preferably, the projection module includes a port containing an interface for communication with the docking station.

In an exemplary mobile media station, the docking station can be permanently attached to the cart. In such cases, any necessary hardware, such as power cords, phone lines, control lines (e.g., modem lines), and network lines (e.g., Ethernet lines), can be pre-wired and hidden from view and can at least be away from the audience.

Figure 11:
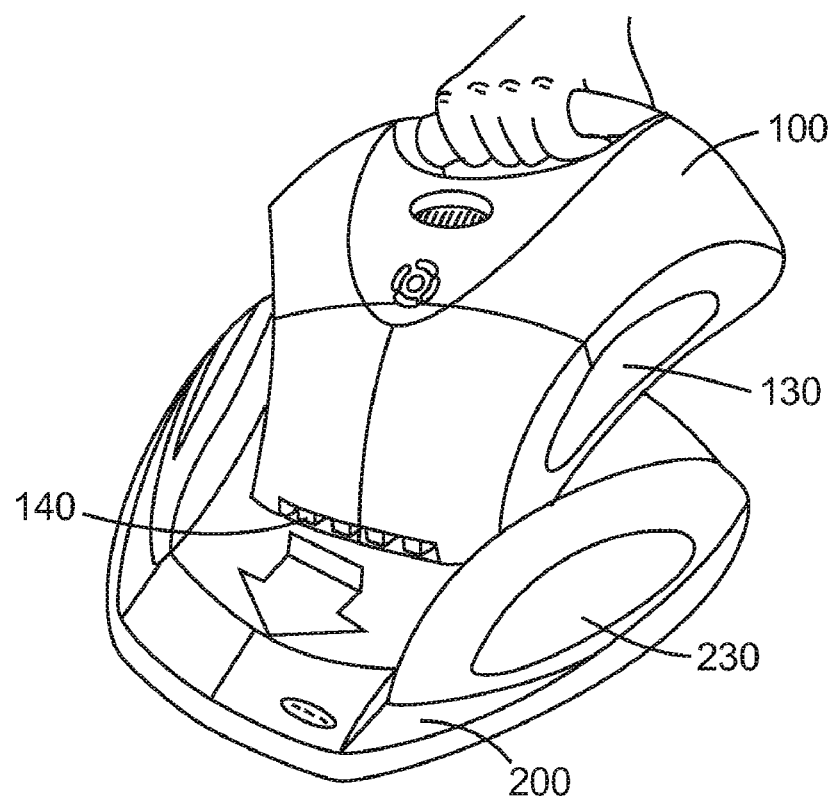
FIG. 11 shows an exemplary projection module and docking station according to another embodiment of the present invention.
Figure 12:
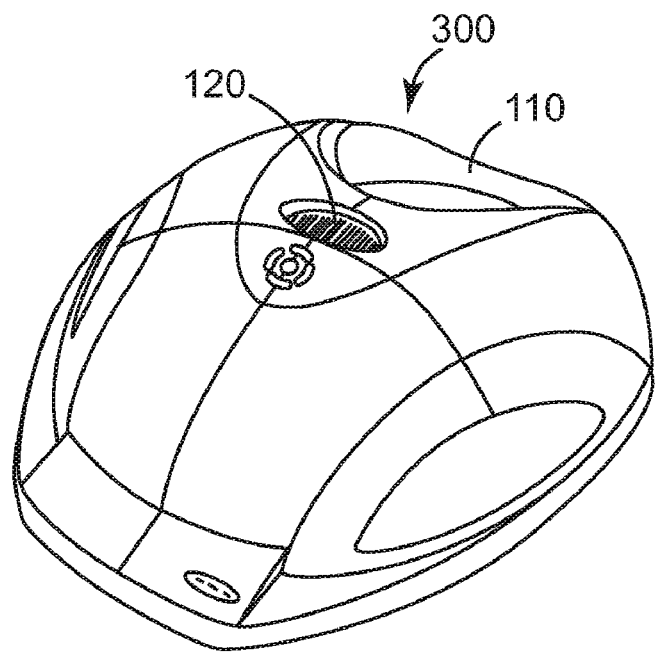
FIG. 12 shows the exemplary projection module of FIG. 11 docked in a docking station.

According to yet another embodiment, FIGS. 11 and 12 show a front projection display device 300 that includes projection module 100 and an exemplary docking station 200. As shown above, the projection module can include a handle 110. In addition, the projection module can include a manual focusing mechanism 120. The handle is a desirable feature as it allows for portability of the projection module. FIG. 11 shows a front projection display device where projection module 100 has not been installed in docking station 200. The projection module can include a port 140 containing an interface for communication with the docking station 200. Further, the projection module and the docking station can be equipped with speakers 130 and/or 230, respectively.

As mentioned above, the docking station can be equipped with various accessories to support operation of the projection module. Preferably, a network connection can also be included to provide access to an infrastructure network to allow a presenter access to and display of files residing on the network.

Figure 13:
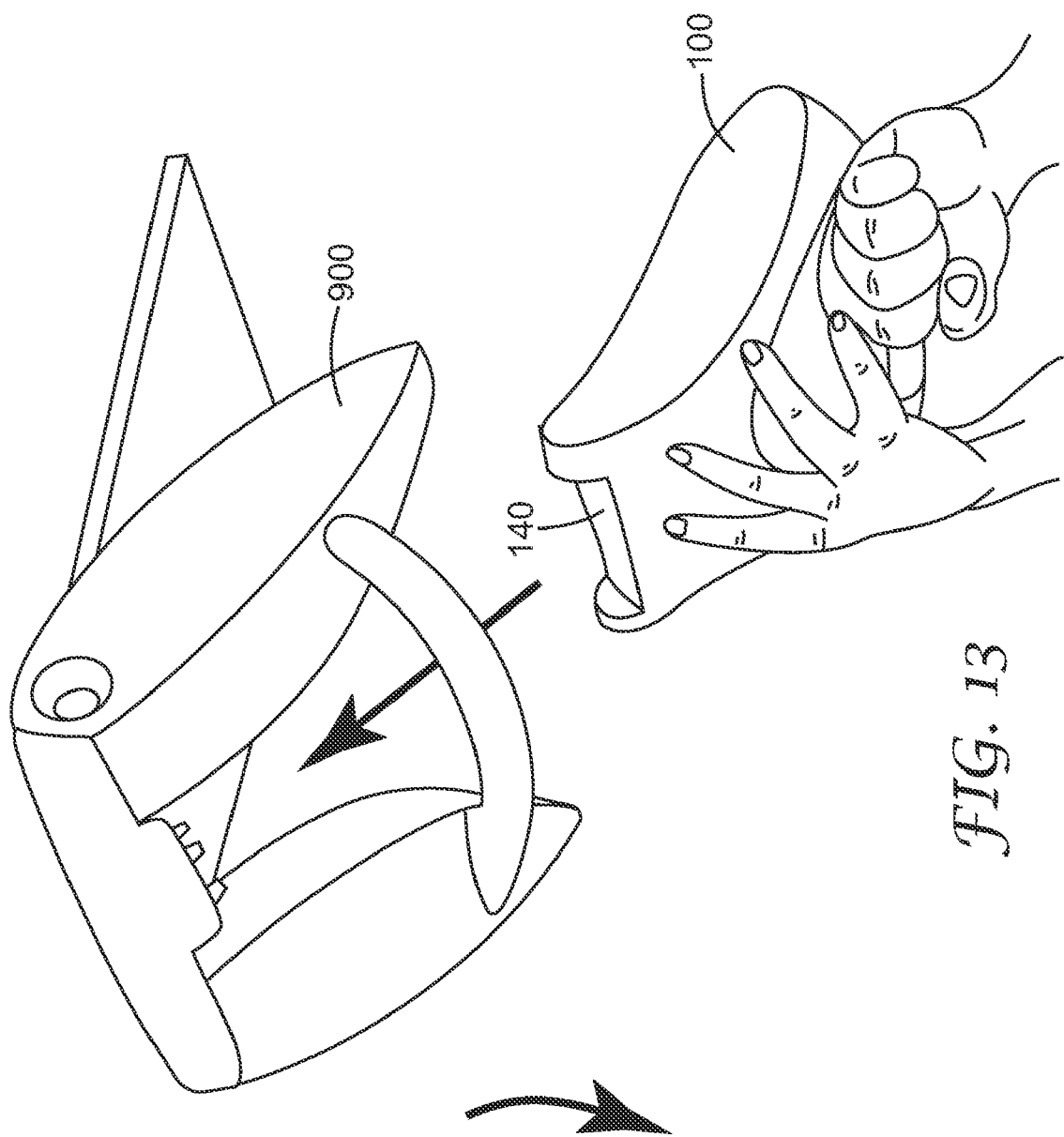
FIG. 13 shows an exemplary projection module being docked in a ceiling mounted docking station according to another embodiment of the present invention.

In one exemplary application, the docking station 200 can be attached to a surface, such as a tabletop or a ceiling. In such cases, any necessary hardware, such as power cords, phone lines, control lines (e.g., modem lines), and network lines (e.g., Ethernet lines), can be pre-wired and hidden from view and can at least be away from the audience. For example, FIG. 13 shows the projection module 100 in the process of being docked to ceiling mounted docking station 900.

In a further exemplary application, the projection module can be detached from the docking station and can be used separately. In such case, the projection module can be equipped to provide power for the module to operate, such as with electrical power cords or batteries.

Figure 7A:
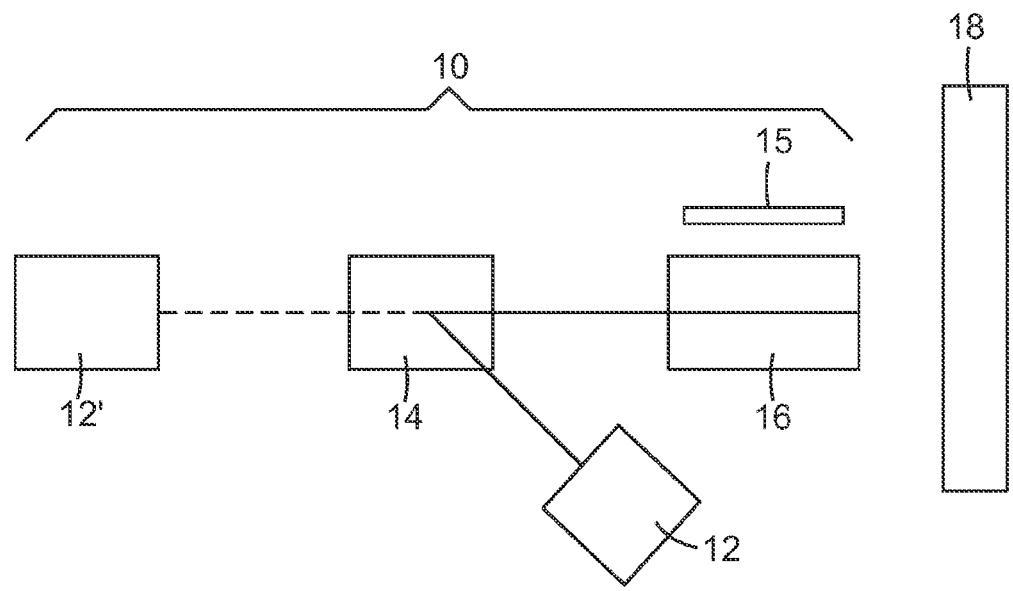
FIG. 7A is a schematic representation of an exemplary wide-angle projection lens that can be used in the present invention.

In each of the aforementioned embodiments, the projection module can include an optical engine that supplies an image to a viewing screen or surface. For example, FIG. 7A shows a schematic representation of exemplary optical engine 10 that can be used in the projection module. The optical engine has one or more of the following components: illumination system 12 or 12', imaging system 14, focus mechanism 15, and projection optics 16. While two different illumination systems 12 and 12' are shown, typically only one is used. When the illumination system lies in position depicted by reference number 12, the imager used is a reflective imager. In contrast, when the illumination system lies in position depicted by reference number 12', the imager used is a transmissive imager. The optical engine generates an image on projection screen 18. Because the viewer and the optical engine are on the same side of the projection screen, FIG. 7A depicts a front projection display system using optical engine 10. Each element in the optical engine is discussed in detail below.

In one embodiment, the illumination system includes a lamp unit, a filter (such as an infrared light and/or a ultraviolet light rejection filter), a color separation means, and an integrator. In one exemplary embodiment, the lamp unit includes a reflector and a lamp. Suitable, commercially available lamps include (i) Philips UHP type lamp unit, which uses an elliptic reflector, from Philips Semiconductors, Eindhoven, The Netherlands and (ii) OSRAM P-VIP 250 lamp unit from OSRAM GmBH, Munich, Germany. Other suitable lamps and lamp unit arrangements can be used in the present invention. For example, metal halide lamps or tungsten halogen lamps or light emitting diodes (LED's) can be used. The type of filter, color wheel, and integrator that can be used in the present invention are not critical. In one exemplary embodiment, the color separation means is a spinning red/green/blue (RGB) color sequential disc in the light source of the imager. An illustrative commercially available color wheel is the UNAXIS RGBW color wheel, from UNAXIS Balzers, LTD, Balzers, Liechtenstein. A liquid crystal RGB color sequential shutter can also be used in the present invention. An illustrative commercially available integrator is a hollow tunnel type integrator from UNAXIS Balzers LTD.

In one embodiment, the imaging system includes an imager and typically also includes conventional electronics. A useful reflective imager that can be used in the present invention is a XGA digital micromirror device (DMD) having a diagonal of about 22 mm, available from Texas Instruments, Dallas, Tex. Alternatively, a transmissive or reflective liquid crystal display can be used as the imager. In the optical engine, the surface of the imager is positioned substantially parallel to the surface of the projection screen.

In one embodiment, the focusing mechanism can be accomplished by mounting one or more of the lenses described below on a slidable or threaded mount, which can be adjusted manually by a user or through the use of an electronic actuation mechanism. For example, focusing can be accomplished by using a varifocal or a zoom lens. Alternatively, no user focus is required for projection units having a predetermined fixed position established between the optical engine and the viewing screen.

The screen may comprise a multi-layer material, for example, a plurality of Fresnel elements configured as is described in U.S. Pat. No. 6,179,426. The screen can alternately be a digital white board, as described in U.S. Pat. No. 6,179,426. The screen can be designed to control light distribution spreading in the horizontal direction to accommodate viewers who are positioned horizontally in front of the screen. Alternative embodiments of the screen may comprise 3M multi-layer film, 3M's Dual Brightness Enhancement Film (DBEF) film, or 3M's VIKUITI™ film. Optionally, the generated image can be viewed on any surface, e.g., a wall or other structure, or standard viewing screen.

Figure 7B:
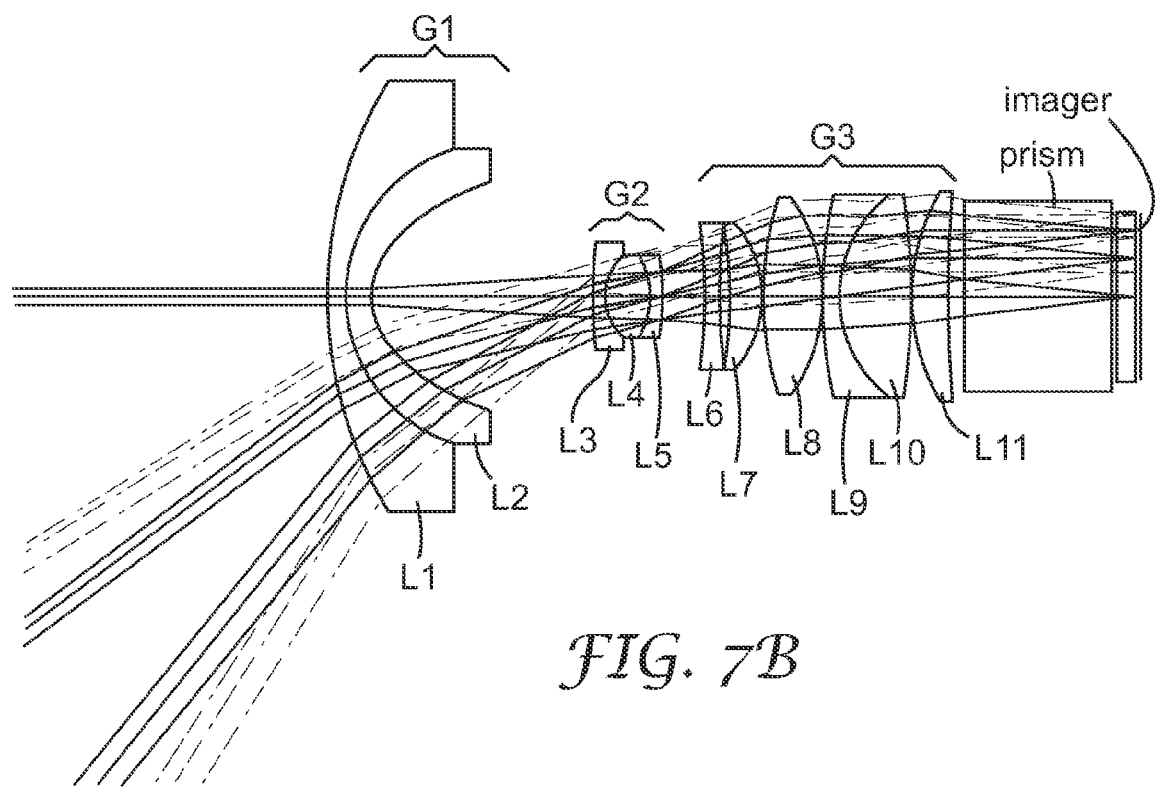
FIG. 7B is a schematic representation of an exemplary wide-angle projection lens that can be used in the present invention.

In one embodiment, as shown in FIG. 7B, the wide-angle projection lens of the optical engine 10 can include three lens groups in the following sequential order from a screen side: first lens group (G1), second lens group (G2), and third lens group (G3). The term "screen side" means that side of the projection lens closest to a projection screen. The three lens groups are discussed in detail below.

In a first embodiment, the first lens group is of negative refractive power and is formed of a plurality of lens elements. In the first lens group, a first lens element (L1), lying closest to the screen, has the largest diameter of all the lenses in the three lens groups. In one exemplary embodiment, the first lens element in the first lens group has a sufficiently large diameter to project an image at a large field, i.e., at a half field angle greater than 45°, preferably greater than 50° and most preferably about 55° in the direction of the screen with substantially no distortion. By substantially no distortion, it is meant that the distortion is no greater than 2%. In preferred aspects, the distortion is less than or equal to 1%, most preferably less than or equal to 0.5%.

In another exemplary embodiment, the first lens element in the first lens group has a diameter greater than 60 mm and less than 75 mm. In yet another exemplary embodiment, the first lens element of the first lens group has a diameter of 70 mm. Thus, when implemented in a projection device, the first lens element can provide a field of view of about 110° to about 120°.

In this embodiment, the first lens group further includes a second lens element (L2) having at least one aspheric surface. The aspheric surface of the present embodiment can help reduce distortion effects, while still providing a large field of view. In one embodiment, the second lens element is fabricated from an optical polymer having a refractive index of 1.49 and an Abbe number of 57.2, such as polymethyl methacrylate (PMMA). The shape of the aspheric surface can be defined by the equation below:

$$Z = \frac{cr^2}{1+\sqrt{1-(1+k)c^2r^2}} + \alpha_2 r^2 + \alpha_4 r^4 + \alpha_6 r^6 + \alpha_8 r^8 + \alpha_{10} r^{10} \qquad \text{Equation 1}$$

where
- Z is the surface sag at a distance r from the optical axis of the system
- c is the curvature of the lens at the optical axis in $$\frac{1}{mm}$$

- r is the radial coordinate in mm
- k is the conic constant
- $\alpha_2$ is the coefficient for second order term, $\alpha_4$ is the coefficient for fourth order term, $\alpha_6$ is the coefficient for sixth order term, $\alpha_8$ is the coefficient for eighth order term, and $\alpha_{10}$ is the coefficient for tenth order term.

In another embodiment, the second surface of the first element of the first lens group has a radius of curvature substantially equal to the radius of curvature of the first surface of the second lens element in the first lens group.

In one embodiment, the first lens group includes two meniscus shaped, nested lens elements, a first meniscus shaped element made of glass and a second meniscus shaped element made of plastic, with controlled thickness on the plastic element. A plastic such as PMMA can be used. The two elements are spaced apart such that the ratio of the distance between the second surface of the first element and the first surface of the second element to the overall effective focal length of the projection lens is 1/175.

In an exemplary embodiment, the second shaped element comprises an aspheric lens (e.g., a lens having at least one aspheric surface) having a substantially uniform thickness throughout. This dome-shaped design can reduce thermal problems and can provide for straightforward manufacturing.

In an alternative embodiment, the first lens group can comprise two shaped elements molded together to form one integral element. For example, the first shaped element can comprise a glass element and the second shaped element can comprise a plastic (e.g., PMMA) element molded onto the second surface of the first shaped element.

In another alternative, the first lens group can comprise a single element (e.g., a single glass element), with an aspheric surface formed on the first surface, second surface, or both surfaces of the single element.

Now turning to the second lens group, it is of substantially zero refractive power. The second lens group is formed of a plurality of lens element. The aperture stop of the projection lens lies within or near the second lens group. For example, in one embodiment, referring to FIG. 8, the aperture stop is provided about L5.

In an exemplary embodiment, all lens elements in the second lens group can have spherical surfaces. In one exemplary embodiment, the second lens group is formed of a cemented triplet to help control spherical aberration and coma. The on-axis spacing between the lens elements in G1 and the lens elements in G2 can be varied, if desired.

In an exemplary embodiment, the second lens group provides a longer effective focal length. In addition, in an exemplary embodiment, the elements that make up the second lens group are formed from glass.

In an alternative embodiment, a doublet can be used for the second lens group. In this alternative embodiment, one or both of the doublet elements can include an aspheric surface.

The third lens group is of positive refractive power and all lens elements in this lens group have spherical surfaces. In an exemplary embodiment, the third lens group provides color aberration correction (i.e., primary and secondary dispersion compensation). In one embodiment, lenses L7, L8, L10, and L11 can comprise the same glass material, e.g., MP 52. Alternatively, other glasses may also be utilized.

A prism (e.g., a TIR prism, not shown) can be disposed between the third lens group and the imager i.e., at a location furthest away from the screen side. Alternatively, a field lens can be utilized.

FIG. 7B shows one exemplary embodiment of the wide-angle projection lens having 11 optical elements comprising the three lens groups, numbered from the screen side. The first lens group (G1) can include a first lens element (L1) of negative refractive power and a second lens element (L2) having an aspheric surface on its second surface. G1 is preferably of negative refractive power. The ratio of $F_1/F$ in G1 is such that $-3.5 < F_1/F < -2.3$. The second lens group (G2) is formed of three lens elements, (L3) to (L5) inclusive, cemented together using a conventional adhesive. G2 is substantially zero refractive power. In one embodiment, it can be slightly positive. In another embodiment, it can be slightly negative. The ratio of $F_2/F$ in G2 is such that $-95 < F_2/F < -86$. The aperture stop lies within or near the second lens group. The third lens group (G3) is formed of six lens elements (L6) to (L11) inclusive. G3 is of positive refractive power. The ratio of $F_3/F$ in G3 is such that $2.5 < F_3/F < 3.2$. As shown in FIG. 7B, a prism can lie to the right of L11, i.e., furthest away from the projection screen.

For the above exemplary lens of FIG. 7B, Table 1 below lists the surface number, in order from the screen side (with surface 1 being the surface closest to the screen side of the first lens element L1), the curvature (c) near the optical axis of each surface (in 1/millimeters), the on axis spacing (D) between the surfaces (in millimeters), and the glass type is also indicated. One skilled in the art will recognize that from the glass type, it is possible to determine the index of refraction and Abbe number of the material. Surface 0 is the object surface or the surface of the projection screen. In this embodiment, the wide-angle projection lens has an effective overall focal length of 8.8 mm, a half field angle of 55° in the direction of the screen side and operates at F/2.8. The first lens group G1 has an effective focal length of −25.4 mm; the second lens group G2 has an effective focal length of −800 mm; and the third lens group G3 has an effective focal length of 23.5 mm. The projection lens has a total track of 130 mm in this exemplary embodiment.

For the embodiment in FIG. 7B, the second surface of the second lens element in the first lens group (denoted as surface 4 in Table 1) is aspheric, as governed by Equation 1 above, and has the following values for the coefficients: $c=0.0901$, $k=-0.8938$, $\alpha_2=0$, $\alpha_4=1.99 \times 10^{-5}$, $\alpha_6=-7.468 \times 10^{-8}$, $\alpha_8=3.523 \times 10^{-10}$, and $\alpha_{10}=-5.970 \times 10^{-13}$. The wide-angle projection lens of the embodiment of FIG. 7B has a total track distance of 130 mm. As one skilled in the art will appreciate, in certain applications, such as front-projection display applications, it can be advantageous to have a short total track distance because it would result in a compact projection lens thus minimizing the space requirements of the overall optical engine.

TABLE 1

| Surface No. | C (mm$^{-1}$) | D (mm) | Glass Type |
|---|---|---|---|
| 0 | 0 | 755 | |
| 1 | 0.0143 | 3.00 | SK16 |
| 2 | 0.0397 | 0.05 | |
| 3 | 0.0397 | 4.00 | Plastic |
| 4* | 0.0901 | 35.7 | |

TABLE 1-continued

| Surface No. | C (mm⁻¹) | D (mm) | Glass Type |
|---|---|---|---|
| 5 | 0.0134 | 1.87 | N-LAF34 |
| 6 | 0.110 | 7.20 | F2 |
| 7 | −0.0796 | 2.00 | N-LAF34 |
| 8 | −0.0214 | 6.78 | |
| 9 | −0.0124 | 2.33 | N-LAK8 |
| 10 | 0.0117 | 1.49 | |
| 11 | −0.0148 | 5.35 | N-PK52 |
| 12 | −0.0553 | 0.187 | |
| 13 | 0.0178 | 9.48 | N-PK52 |
| 14 | −0.0365 | 0.187 | |
| 15 | 0.0110 | 2.40 | PBH6 |
| 16 | 0.0486 | 11.5 | N-PK52 |
| 17 | −0.00866 | 0.187 | |
| 18 | 0.0313 | 5.99 | N-PK52 |
| 19 | 0.00432 | 2.69 | |
| 20 | 0 | 23.4 | BK7 |
| 21 | 0 | 1.00 | |
| 22 | 0 | 3.00 | FK5 |
| 23 | 0 | 0.480 | |
| 24 | 0 | 0 | |

Tables 2 and 3 below list the general lens data and the surface data summary for the embodiment of FIG. 7B.

TABLE 2

GENERAL LENS DATA:

| Surfaces | 24 |
|---|---|
| Stop | 8 |
| System Aperture | Image Space F/# - 3 |
| Glass Catalogs | schott_2000 OLD_SCHO OHARA CORNING OLD_OHAR MISC |
| Ray Aiming | Real Reference, Cache On |
| X Pupil Shift | 0 |
| Y Pupil Shift | 0 |
| Z Pupil Shift | 0 |
| Apodization | Uniform, Factor = 1.00000E+000 |
| Effective Focal Length | 8.806583 (in air) |
| Effective Focal Length | 8.806583 (in image space) |
| Back Focal Length | 0.4613371 |
| Total Track | 130.237 |
| Image Space F/# | 3 |
| Paraxial Working F# | 3.000816 |
| Working F/# | 2.995898 |
| Image Space NA | 0.1643555 |
| Object Space NA | 0.001891026 |
| Stop Radius | 4.013512 |
| Paraxial Image Height | 13.4 |
| Paraxial Magnification | −0.01134926 |
| Entrance Pupil Diameter | 2.935528 |
| Entrance Pupil Position | 21.1718 |
| Exit Pupil Diameter | 122.5057 |
| Exit Pupil Position | −367.5356 |
| Field Type | Paraxial Image height in millimeters |
| Maximum Field | 13.4 |
| Primary Wave | 0.55 |
| Lens Units | Millimeters |
| Angular Magnification | 0.02396238 |

TABLE 3

SURFACE DATA SUMMARY:

| Surf | Type | Comment | Radius | Thickness | Glass | Diameter | Conic |
|---|---|---|---|---|---|---|---|
| OBJ | STANDARD | | Infinity | 755 | | 2361.387 | 0 |
| 1 | STANDARD | 148-2A | 69.7004 | 3 | SK16 | 70 | 0 |
| 2 | STANDARD | | 25.176 | 0.05 | | 47.55672 | 0 |
| 3 | STANDARD | 20A | 25.176 | 4 | 1.491000, 57.200000 | 48 | 0 |
| 4 | EVENASPH | | 11.09472 | 35.68789 | | 38 | −0.8938386 |
| 5 | STANDARD | 449-1B | 74.447 | 1.866667 | N-LAF34 | 17 | 0 |
| 6 | STANDARD | NEW | 9.0968 | 7.2 | F2 | 13.5 | 0 |
| 7 | STANDARD | 46-1 | −12.5675 | 2 | N-LAF34 | 13.5 | 0 |
| STO | STANDARD | 565-1B | −46.676 | 6.775973 | | 13.5 | 0 |
| 9 | STANDARD | 169-3A | −80.8308 | 2.333333 | N-LAK8 | 24 | 0 |
| 10 | STANDARD | NEW | 85.79379 | 1.491645 | | 21.2 | 0 |
| 11 | STANDARD | 650-1A | −67.755 | 5.352434 | N-PK52 | 21.2 | 0 |
| 12 | STANDARD | 588-1B | −18.0787 | 0.1866667 | | 24 | 0 |
| 13 | STANDARD | 116-2A | 56.217 | 9.481976 | N-PK52 | 32 | 0 |
| 14 | STANDARD | 700-1B | −27.3991 | 0.1866667 | | 32 | 0 |
| 15 | STANDARD | 665-1B | 91.167 | 2.4 | PBH6 | 33 | 0 |
| 16 | STANDARD | 11A | 20.5695 | 11.47223 | N-PK52 | 33 | 0 |
| 17 | STANDARD | 463-1B | −115.465 | 0.1866667 | | 33 | 0 |
| 18 | STANDARD | 35B | 32 | 5.992456 | N-PK52 | 34 | 0 |
| 19 | STANDARD | 331-1A | 231.217 | 2.692432 | | 34 | 0 |
| 20 | STANDARD | | Infinity | 23.4 | BK7 | 30.90276 | 0 |
| 21 | STANDARD | | Infinity | 1 | | 27.53016 | 0 |
| 22 | STANDARD | | Infinity | 3 | FK5 | 27.31099 | 0 |
| 23 | STANDARD | | Infinity | 0.48 | | 26.87009 | 0 |
| IMA | STANDARD | | Infinity | | | 26.76488 | 0 |

The data provided in the Tables above represent one example and are not intended to limit the scope of the invention described herein.

Due to the large field of view of the optical engine described herein, the front projection display device can provide a large image size at a short throw distance. As stated previously, the device can be placed at a relatively short distance (e.g., 27-33 inches) from the viewing screen or surface to produce a 60 inch image size (as measured diagonally). Thus, in one exemplary embodiment, the ratio of the distance from the viewing screen to the image size (diagonal, 4×3 format) can be 1 to 1.8-2.2. As a comparison, a conventional projector has a ratio of the distance from the viewing screen to the image size (diagonal, 4×3 format) of 1 to 0.7-0.9. The terms "4×3 format" and "16×9 format" refer to conventional image formats as measured by the image width by the image height.

For example, for an image size of about 40 inches (diagonal, 4×3 format), the front projection display device is placed at a distance from the screen of about 18-22 inches. For a 60 inch (diagonal, 4×3 format) image size, the front projection display device is placed at a distance from the screen of about 27-33 inches. Of course, the exemplary optical engine described herein can provide an image size of greater than 60 inches (diagonal, 4×3 format), if necessary, using a relatively short throw distance at an extreme off-axis position.

In addition, the optical engine is designed so that little or no keystone correction is necessary, while distortion is reduced. In one exemplary embodiment, the optical engine can provide an image having a 4×3 format. In another exemplary embodiment, the optical engine can be implemented with a suitable imager to provide a different screen format, such as a 16×9 format.

Alternatively, the optical engine can be implemented with correction circuitry (e.g., a conventional warp chip), which can result in sufficient image quality at even shorter throw distances.

The exemplary embodiments of the present invention provide various advantages over known projection systems. For example, a front projection display device and projection module of exemplary embodiments can have a short throw distance, where the projection display device/projection module can be placed very close (i.e., at a distance of less than about 1 meter) to the projection screen or the projection surface, such as a wall, for a full size image (i.e., an image having a size of at least 40 inches, as measured along the diagonal). Because the front projection display device/projection module is at a close distance to the screen, the likelihood of light from the device shining into the presenter's eyes while making a presentation can be reduced. When used in a tabletop setting, any noise or heat that may be generated by the device is typically at a sufficiently far distance from the audience. Moreover, the presenter is not required to move objects on the tabletop or provide for special seating of the audience to ensure that members of the audience are not in the device's light path. Thus, the projection device described herein can be used in a smaller space for presentations, such as a small office or a small cubicle.

The use of the exemplary docking station can provide the benefit of a reduction in cost. For example, the cost of the projection module will typically be higher than that of the docking station. An organization can have more docking stations than projection modules in its facilities. As shown above, the use of an exemplary handle can provide straightforward transportation of the projection module to a desired location. The docking station may or may not be permanently attached to a surface, such as a wall. In the case of permanent attachment, the projection module can be installed into the dock in a straightforward manner, minimizing the setup time that may be required to attach any desired hardware, such as power cords, phone lines, and the like. In the case where the docking station is not permanently attached, it, along with the projection module, are both portable. Such a portable system is particularly beneficial in settings such as a trade show.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A mobile media station comprising:
    a cart;
    a screen attachable to the cart; and
    a projection display device disposed on the cart to provide an image to the screen, the device comprising:
        a projection module to project the image; and
        a docking station to receive the projection module,
            wherein the projection module comprises an optical engine comprising an illumination system, an imaging system, and a wide angle projection lens, wherein the optical engine outputs an image at a half field angle of at least 45° and wherein the image has substantially no distortion and requires substantially no keystone correction, and
            further wherein the wide-angle projection lens comprises the following components in sequential order from a screen side:
                a first lens group of negative refractive power, the first lens group having at least one aspheric surface;
                a second lens group of substantially zero refractive power and wherein an aperture stop lies within or near the second lens group; and
                a third lens group of positive refractive power,
            wherein the following Conditions (1) to (3) are satisfied:

$|F_1/F|<4.0$      Condition (1)

$|F_2/F|>50$      Condition (2)

$|F_3/F|<3.5$      Condition (3)

where
    F is the focal length of the wide-angle projection lens;
    $F_1$ is the focal length of the first lens group;
    $F_2$ is the focal length of the second lens group; and
    $F_3$ is the focal length of the third lens group.

2. The mobile media station of claim 1, wherein the docking station comprises
    a power supply to supply power to the projection module; and
    a communications line to provide communication between the projection module and a computer.

3. The mobile media station of claim 2, wherein the docking station further comprises a connection to provide at least one of a wired and a wireless network connection.

4. The mobile media station of claim 1, wherein the projection module further comprises at least one of a handle and an expansion module.

* * * * *